US008638727B2

(12) United States Patent
Björken

(10) Patent No.: US 8,638,727 B2
(45) Date of Patent: Jan. 28, 2014

(54) METHOD AND ARRANGEMENTS IN A RADIO COMMUNICATION SYSTEM

(75) Inventor: Peter Björken, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1428 days.

(21) Appl. No.: 12/091,378

(22) PCT Filed: Nov. 1, 2005

(86) PCT No.: PCT/SE2005/001641
§ 371 (c)(1),
(2), (4) Date: Apr. 24, 2008

(87) PCT Pub. No.: WO2007/053069
PCT Pub. Date: May 10, 2007

(65) Prior Publication Data
US 2008/0285523 A1    Nov. 20, 2008

(51) Int. Cl.
*H04W 4/00* (2009.01)
*H04J 3/04* (2006.01)
*H04W 72/00* (2009.01)

(52) U.S. Cl.
USPC .......................... 370/329; 370/535; 455/450

(58) Field of Classification Search
USPC .................................................. 370/330, 329
See application file for complete search history.

(56) References Cited

U.S. PATENT DOCUMENTS

| 5,539,730 | A  | * | 7/1996  | Dent .............................. 370/280 |
| 6,707,808 | B1 |   | 3/2004  | Vedrine |
| 6,795,428 | B1 | * | 9/2004  | Diachina et al. .............. 370/349 |
| 6,865,165 | B1 | * | 3/2005  | Huttunen ....................... 370/329 |
| 7,145,896 | B1 | * | 12/2006 | Sebire ........................... 370/349 |
| 7,181,223 | B1 | * | 2/2007  | Pecen et al. ................. 455/452.1 |
| 7,362,725 | B2 | * | 4/2008  | Lintulampi et al. .......... 370/329 |
| 2002/0041583 | A1 | * | 4/2002  | Lintulampi et al. .......... 370/337 |
| 2003/0054850 | A1 | * | 3/2003  | Masseroni et al. ............ 455/522 |
| 2004/0184426 | A1 | * | 9/2004  | Tan ................ 370/338 |
| 2004/0203811 | A1 | * | 10/2004 | Rudowicz ..................... 455/450 |
| 2004/0258017 | A1 | * | 12/2004 | Beard et al. .................... 370/329 |
| 2005/0243744 | A1 | * | 11/2005 | Tan ................ 370/278 |
| 2007/0002863 | A1 | * | 1/2007  | Black ........................... 370/394 |
| 2007/0014265 | A1 | * | 1/2007  | Casaccia ....................... 370/337 |
| 2007/0297533 | A1 | * | 12/2007 | Chitrapu et al. .............. 375/308 |

FOREIGN PATENT DOCUMENTS

| WO | WO 99/41918 | 8/1999 |
| WO | WO 2005/057870 A1 | 6/2005 |

OTHER PUBLICATIONS

Turina, D. et al. "A Proposal for Multi-Slot MAC Layer Operation for Packet Data Channel in GSM" Universal Personal Communications. Sep. 29-Oct. 2, 1996, pp. 572-576. New York, NY. USA.

* cited by examiner

*Primary Examiner* — Guang Li

(57) ABSTRACT

The present invention relates to uplink transmissions and scheduling of resources for uplink transmissions in connection with packet switched communication. A radio communication network schedules (301) time slots for transmission of bursts of a first radio block on at least two different uplink packet data channels and transmits (302) an Uplink State Flag, associated with a mobile station for which the first radio block was scheduled, on a first downlink packet data channel representing a first subperiod within a basic uplink period. The mobile station receives (303) the Uplink State Flag, identifies (304) the scheduled resources for transmission of the first radio block wherein the timing of the first subperiod is derived utilizing the fact that the Uplink State Flag was received on the first downlink packet data channel and transmits (305) the first radio block utilizing the identified resources.

24 Claims, 5 Drawing Sheets

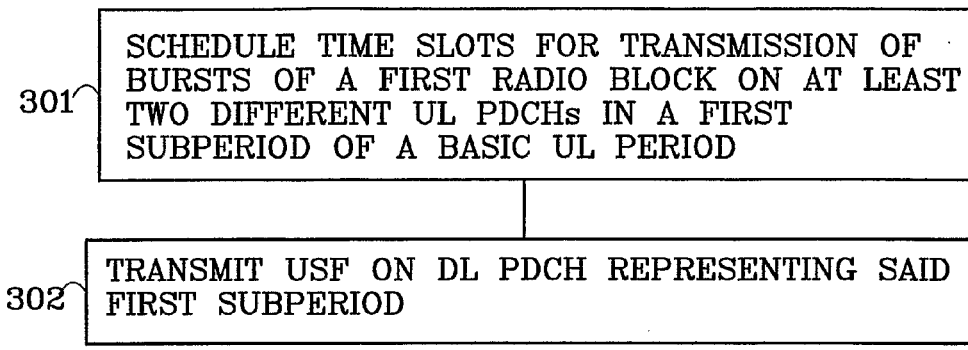
Fig. 3A
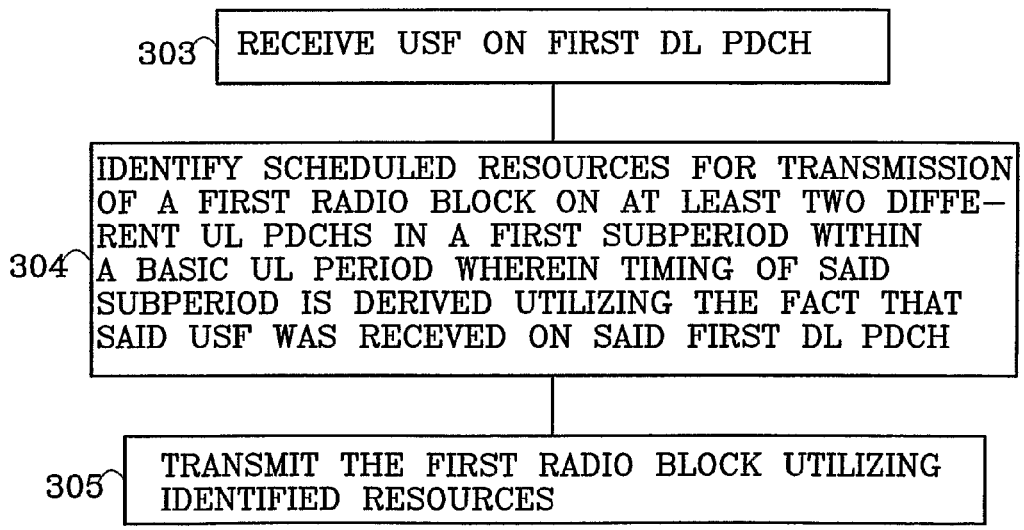
Fig. 3B
| TDMA FRAME | CH1D | CH2D |
|---|---|---|
| M+1 | b11 | b12 |
| M+2 | b13 | b14 |
| M+3 | b21 | b22 |
| M+4 | b23 | b24 |
Fig. 9

METHOD AND ARRANGEMENTS IN A RADIO COMMUNICATION SYSTEM

TECHNICAL FIELD OF THE INVENTION

The invention relates to methods and arrangements in a radio communication system. More in particular the invention relates to methods and arrangements (including a mobile station and a control apparatus) relating to uplink transmissions and scheduling of resources for uplink transmissions in connection with packet switched communication.

DESCRIPTION OF RELATED ART

The Third Generation Partnership Project (3GPP) specifications covering General packet radio service (GPRS) and Enhanced General packet radio service (EGPRS) provides for packet switched communication in a radio communication system comprising a radio communication network and mobile stations.

Packet switched data is exchanged between the radio communication network and the mobile stations on Packet Data Channels. Transmissions from mobile stations to the radio communication network occur on uplink Packet Data Channels while transmissions from the radio communication to the mobile stations occur on downlink Packet Data Channels.

GPRS/EGPRS allows several mobile stations to be multiplexed on the same uplink Packet Data Channel. The multiplexing of said mobile stations on the uplink Packet Data Channel is controlled by Uplink State Flags (USFs) transmitted on the corresponding downlink Packet Data Channel. When a specific mobile station receives one of its Uplink State Flags on the downlink Packet Data Channel, it recognizes that it has been assigned resources on the corresponding uplink Packet Data Channel for transmission of one radio block (or a sequence of four radio blocks).

According to 3GPP specifications for GERAN release 6, each uplink radio block is always mapped as four bursts on one uplink Packet Data Channel resulting in a radio block period of 20 ms. In order to provide reduced latency, an alternative new radio block mapping scheme has been proposed in which bursts of an uplink radio block is mapped on at least two different uplink Packet Data Channels. Thus, mapping the four bursts of an uplink radio block as two bursts each on two different uplink Packet Data Channels results in a radio block period of 10 ms while mapping the four bursts of an uplink radio block as one burst each on four different uplink Packet Data Channels results in a radio block period of 5 ms.

WO 99/41918 discloses a packet data communication system using Uplink State Flags transmitted in the downlink direction for scheduling of traffic in the uplink for one or several mobile users utilizing the same physical channel. An Uplink State Flag indicates to a mobile that one or several consecutive radio blocks are reserved for uplink transmission from a specific mobile avoiding the need for the mobile station to receive the USF during the remaining period defined by the number of radio blocks scheduled.

SUMMARY OF THE INVENTION

The problem addressed by the present invention is providing ways of scheduling uplink transmission resources and performing uplink transmissions when mapping radio blocks on at least two different uplink Packet Data Channels.

A general advantage of the invention is that it supports uplink transmissions and scheduling of uplink transmission resources when mapping radio blocks on at least two different uplink Packet Data Channels.

A more specific advantage of some embodiments of the invention is that it allows multiplexing of legacy mobile stations and mobile stations supporting mapping of radio blocks on at least two different uplink Packet Data Channels on a common set of uplink Packet Data Channels.

The invention will now be described in more detail with reference to exemplary embodiments thereof and also with reference to the accompanying drawings.

BRIEF DESCRIPTION OF THE DRAWINGS

FIG. 3A is a flow diagram illustrating a basic method for scheduling uplink transmission resources according to the invention.

FIG. 3B is a flow diagram illustrating a basic method for uplink transmission according to the invention.

FIG. 9 is a channel diagram illustrating an example scenario of burst sequences when two downlink radio blocks are both mapped on two downlink Packet Data Channels.

DETAILED DESCRIPTION OF THE EMBODIMENTS

Figure 1:
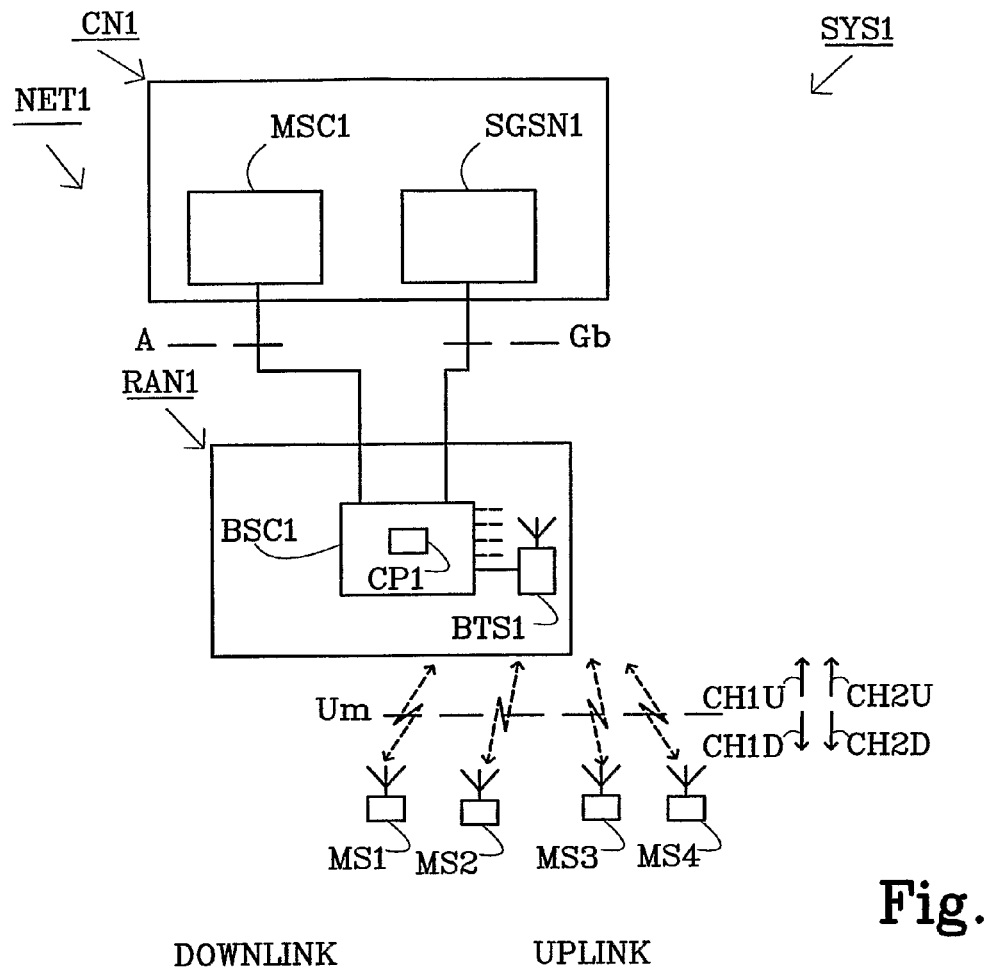
FIG. 1 is a schematic view of an example radio communication system in which the present invention may be employed.

FIG. 1 illustrates a non-limiting example of a radio communication system SYS1 in which the present invention may be employed. The communication system SYS1 includes a cellular radio communication network NET1, alternatively referred to as a Public Land Mobile Network (PLMN) and a plurality of mobile stations including mobile stations MS1-MS4.

The exemplary cellular radio communication network NET1 includes a core network CN1 and a GSM/EDGE Radio Access Network (GERAN) RAN1, alternatively referred to as a Base Station System (BSS).

The core network CN1 includes a Mobile services Switching Center (MSC) node MSC1 that provides circuit-switched services and a General Packet Radio Service (GPRS) node SGSN1, sometimes referred to as a serving GPRS support node (SGSN), which is tailored to provide packet-switched type services.

The radio access network RAN1 includes one or more base station controllers (BSCs). For sake of simplicity, the radio access network RAN1 of FIG. 1 is shown with only one base station controller BSC1. Each base station controller is connected to and controls a plurality of base transceiver stations (BTSs) such as base station transceiver station BTS1 illustrated in FIG. 1. The radio access network RAN1 is connected to the mobile services switching center MSC1 over an interface referred to as the A interface while the radio access network RAN1 is connected to the serving GPRS support node SGSN1 over an interface referred to as the Gb interface.

The Radio Access Network RAN1 provides radio communication between the cellular radio communication network NET1 and mobile stations such as mobile stations MS1-MS4 over a radio interface referred to as the Um interface. The details of the Um-interface are specified in the 44- and 45-series of the Third Generation partnership Project (3GPP) Technical Specifications.

The radio communication system SYS1 in FIG. 1 supports packet switched communication using General Packet Radio Service (GPRS) and Enhanced General Packet Radio Service (EGPRS) according to the 3GPP specifications.

Communication of packet switched data between the radio communication network NET1 and the mobile stations MS1-MS4 occurs utilizing so called Temporary Block Flows (TBFs). The radio communication network NET1 communicates packet switched data to any one of the mobile stations MS1-MS4 utilizing a downlink Temporary Block Flow established with the relevant mobile station MS1-MS4 while the respective mobile stations MS1-MS4 communicates packet switched data to the radio communication network NET1 utilizing an uplink Temporary Block Flow established between the mobile station and the radio communication network NET1.

When configuring an uplink Temporary Block Flow, a list of one or more uplink Packet Data Channels (PDCHs) and a corresponding Uplink State Flag (USF) value per corresponding downlink Packet Data Channel is associated with the uplink Temporary Block Flow in order to support allocation of uplink resources associated with the uplink Temporary Block Flow.

Packet Data Channels are the physical channels used to convey packet switched data in a GPRS/EGPRS system. Each Packet Data Channel is defined by a sequence of radio frequency channels (allowing both frequency hopping and single carrier alternatives) and time slots (same time slot in each TDMA frame on which the Packet Data Channel is mapped).

FIG. 1 schematically illustrates how the set of Packet Data Channels used to convey packet switched data between the radio communication network NET1 and the mobile stations MS1-MS4 includes a first uplink Packet Data Channel CH1U and a corresponding first downlink Packet Data Channel CH1D as well as a second uplink Packet Data Channel CH2U and a corresponding second downlink Packet Data Channel CH2D.

The packet switched data communicated using a Temporary Block Flow is organized into a number of Radio Link Control/Medium Access Control (RLC/MAC) blocks. Each RLC/MAC block is communicated over the Um interface in a radio block comprising a sequence of four bursts transmitted consecutively on a Packet Data Channel.

In the uplink direction, several mobile stations may be multiplexed on the same uplink Packet Data Channel. The Uplink State Flag is used to control this multiplexing according to the Dynamic Allocation medium access mode. A mobile station associated with an Uplink State Flag (via an established uplink Temporary Block Flow) on a downlink Packet Data Channel, monitors the Uplink State Flags transmitted on said downlink Packet Data Channel. When the mobile station detects its associated Uplink State Flag on the downlink Packet Data Channel, it means that the radio communication network has scheduled resources on the corresponding uplink Packet Data Channel for transmission of one radio block (or a sequence of four radio blocks depending on the assigned USF granularity).

Figure 2:
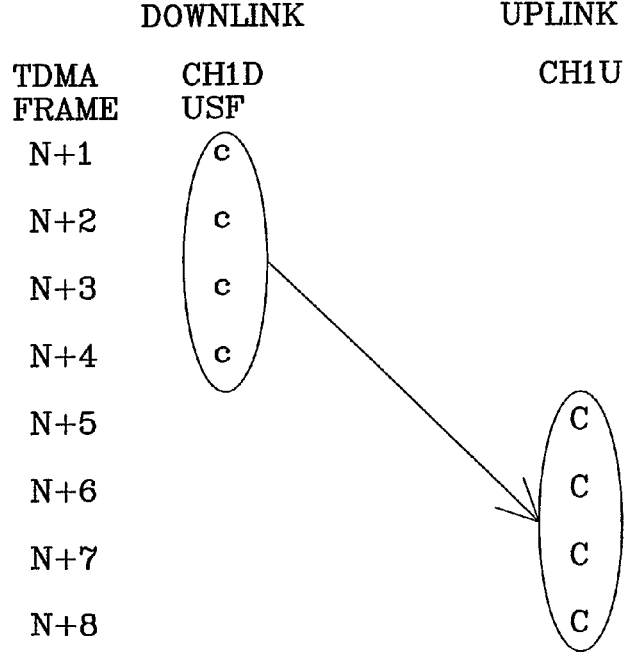
FIG. 2 is a channel diagram illustrating an example scenario of Uplink State Flag transmission on a downlink PDCH triggering transmission of a radio block on the corresponding uplink PDCH.

FIG. 2 schematically illustrates an example scenario where a mobile station, e.g. mobile station MS3, has been associated with an Uplink State Flag ("c" in FIG. 2) on a first downlink Packet Data Channel CH1. Thus, when mobile station MS3 has detected its associated Uplink State Flag on the first downlink packet Data Channel CH1, it transmits a radio block ("C" in FIG. 2) in four bursts on the corresponding uplink Packet Data Channel CH1.

Mobile stations having so called multislot capabilities may in parallel receive transmissions on plural Packet Data Channels in the downlink and transmit on plural Packet Data Channels in the uplink. However, radio blocks are still always mapped as four bursts on one Packet Data Channel and hence when e.g. two Packet Data Channels are used in parallel, two different radio blocks are transmitted/received in parallel, one on each Packet Data Channel.

In order to reduce the Round Trip Time for communication in GPRS/EDGE radio communication systems, it has been proposed to modify the way radio blocks are mapped onto Packet Data Channels so as to reduce the radio block period (sometimes referred to as Transmission Time Interval, TTI). Thus by mapping the four bursts of a radio block onto two different Packet Data Channels in parallel (i.e. two bursts on each Packet Data Channel) instead of mapping said four bursts on one Packet Data Channel, the block period may be reduced from the current value of 20 ms to 10 ms. Similarly, by mapping the four bursts of a radio block onto four different Packet Data Channels (i.e. one burst on each Packet Data Channel), the block period/TTI value may be reduced to only 5 ms.

Changing the radio block mapping as indicated above however causes problems in scenarios where it would be desirable to multiplex both new mobile stations supporting the new radio block mapping and legacy mobile stations on the same group of Packet Data Channels.

The present invention provides ways of scheduling uplink transmission resources and performing uplink transmissions when mapping radio blocks on at least two different uplink Packet Data Channels. Embodiments of the invention further allows multiplexing of mobile stations supporting mapping of radio blocks on at least two uplink Packet Data Channels and legacy mobile stations on a common set of uplink Packet Data Channels. FIG. 3A schematically illustrates a basic method according to the invention for scheduling, in a radio communication network, resources in connection with packet switched communication, wherein uplink and downlink transmissions are segmented into radio blocks and each radio block is transmitted in a plurality of bursts.

At step 301 time slots are scheduled for transmission of bursts of a first radio block on at least two different uplink packet data channels in a first subperiod within a basic uplink period.

At step 302 an Uplink State Flag, associated with a mobile station for which said first radio block was scheduled, is transmitted on a first downlink packet data channel, wherein said first downlink packet data channel is selected among a group of downlink packet data channels corresponding to each of said at least two different uplink packet data channels, wherein each different downlink packet data channel in said group represents a different subperiod within said basic uplink period and said first downlink packet data channel represents said first subperiod within said basic uplink period.

FIG. 3B illustrates a basic method according to the invention for uplink transmission by a mobile station in connection with packet switched communication wherein uplink and downlink transmissions are segmented into radio blocks and each radio block is transmitted in a plurality of bursts.

At step 303, an Uplink State Flag associated with the mobile station is received on a first downlink packet data channel.

At step 304 scheduled resources for transmission of a first radio block are identified in accordance with a radio block mapping mode in which the bursts of the first radio block are scheduled for transmission in time slots on at least two different uplink packet data channels in a first subperiod within a basic uplink period, wherein said first downlink packet data channel is one of a group of downlink packet data channels corresponding to each of said at least two different uplink packet data channels, wherein each different downlink packet data channel in said group represents a different subperiod within said basic uplink period and wherein the timing of said first subperiod within said basic uplink period is derived utilizing the fact that said Uplink State Flag was received on said first downlink packet data channel.

At step 305 the first uplink radio block is transmitted utilizing the resources identified in the identifying step 304.

The basic uplink period corresponds to the time required for transmitting a radio block on one uplink packet data channel. As an example, in a GPRS/EGPRS radio communication system where a radio block is transmitted in four bursts, the basic uplink period corresponds to the time required for transmitting four bursts on one uplink packet data channel.

The number of different subperiods within a basic uplink period matches the number of uplink packet data channels (and corresponding downlink packet data channels) on which time slots are scheduled for transmission of the first radio block. Thus, if the radio block is mapped on two uplink packet data channels, the basic uplink period has two subperiods and if the radio block is mapped on four uplink packet data channels, the basic uplink period has four subperiods.

By letting different downlink Packet Data Channels represent different subperiods within a basic uplink period, it is possible to still use Uplink State Flags transmitted per downlink Packet Data Channel to indicate the allocation of resources according to the new radio block mapping scheme to mobile stations supporting this new radio block mapping scheme. Maintaining the use of Uplink State Flags transmitted per downlink Packet Data Channel is key to enable multiplexing of legacy mobile stations and mobile stations supporting the new radio block mapping scheme on a common set of uplink Packet Data Channels.

Figure 4:
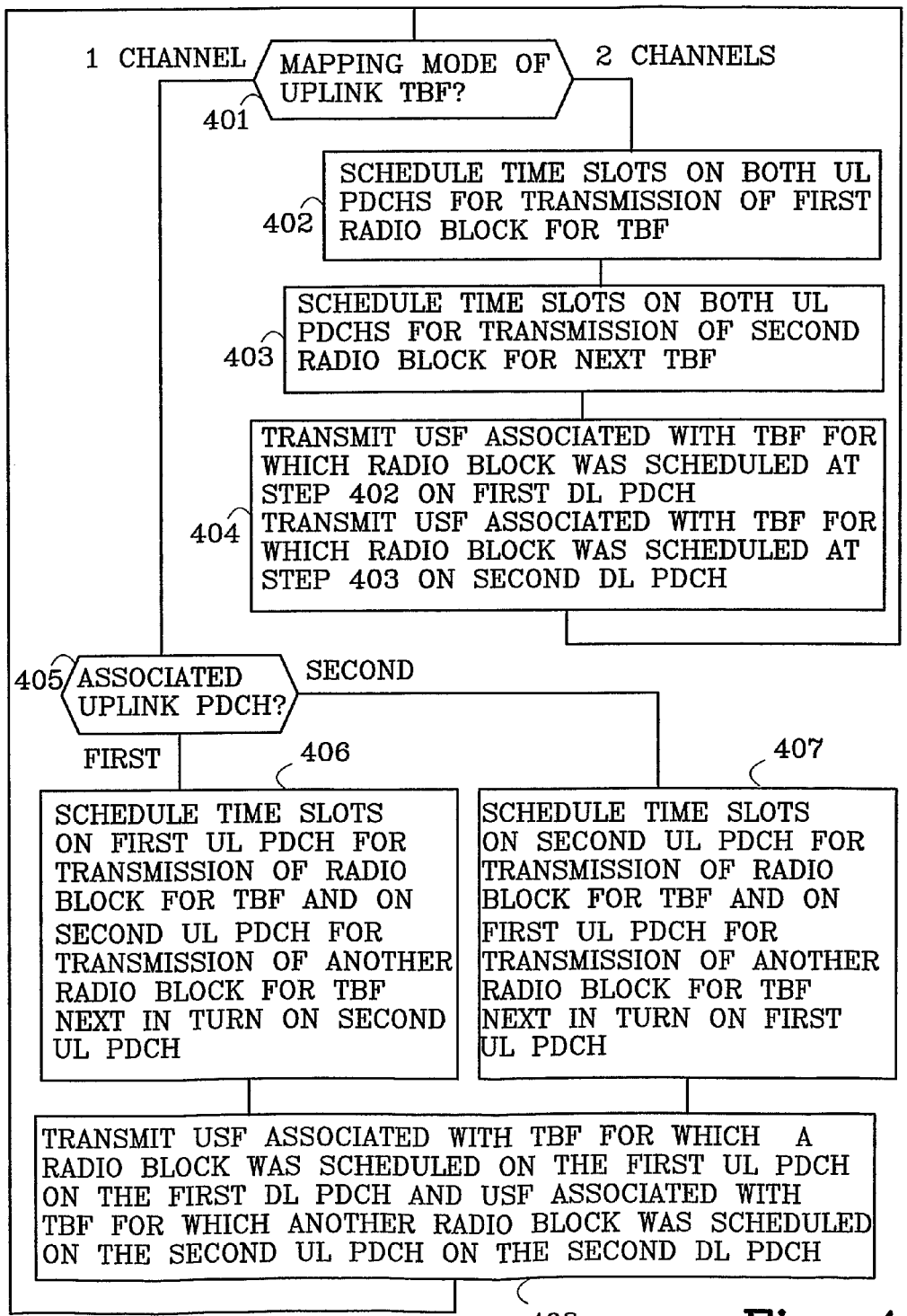
FIG. 4 is a flow diagram illustrating a first exemplary embodiment of a method for scheduling uplink transmission resources according to the invention.

FIG. 4 is a flow diagram illustrating a method in a radio communication network for scheduling uplink transmission resources according to a first exemplary embodiment of the invention. This exemplary method may e.g. be implemented in the radio communication network NET1 in FIG. 1 for scheduling of uplink resources on the first uplink Packet Data Channel CH1U and the second uplink Packet Data Channel CH2U. In this exemplary embodiment, the radio communication network NET1 supports both radio block mapping according to the legacy radio block mapping of GPRS/EGPRS (i.e. mapping an uplink radio block as four bursts on one uplink Packet Data Channel during a basic uplink period) and the proposed new radio block mapping in which bursts of an uplink radio block are mapped onto at least two different uplink Packet Data Channels, such as the first Uplink Packet Data Channel CH1U and the second Uplink Packet Data Channel CH2U, in a subperiod within a basic uplink period. Each uplink Temporary Block Flow configured to use either or both of the first uplink Packet Data Channel CH1U and the second uplink Packet Data Channel CH2U, is associated with a radio block mapping mode attribute indicating whether the radio blocks of the uplink Temporary Block Flow should all be mapped as four bursts on a single uplink Packet Data Channel or as four bursts on two different uplink Packet Data Channels.

At step 401, the radio block mapping mode of an uplink Temporary Block Flow, which is next in turn for getting resources scheduled on either or both of the uplink Packet Data Channels CH1U and CH2U in an upcoming basic uplink period, is checked.

If the radio block mapping mode indicates that bursts should be mapped onto both the first uplink Packet Data Channel CH1U and the second uplink Packet Data Channel CH2U (an alternative "2 CHANNELS" at step 401), processing continues at step 402 where the radio communication network NET1 schedules time slots on both the first uplink Packet Data Channel CH1U and the second Packet Data Channel CH2U for transmission of a first radio block for said Temporary Block Flow. Thus two time slots are scheduled each on the first uplink packet Data Channel CH1U and the second uplink Packet Data Channel CH2U for transmission of bursts of the first radio block in a first subperiod within the basic uplink period.

At step 403, the radio communication network NET1 schedules time slots on both the first uplink Packet Data Channel CH1U and the second Packet Data Channel CH2U for transmission of a second radio block for a Temporary Block Flow which is now next in turn for getting a radio block mapped onto both said uplink Packet Data Channels CH1U and CH2U. Thus two time slots are scheduled each on the first uplink packet Data Channel CH1U and on the second uplink Packet Data Channel CH2U for transmission of bursts of the second radio block in a second subperiod within the basic uplink period.

In this exemplary embodiment, when mapping a radio block in two time slots each on both the first and the second uplink Packet Data Channels CH1U and CH2U, two adjacent radio blocks (i.e. the first and second radio blocks scheduled in steps 402 and 403 above) divides the basic uplink period, corresponding to the time required for transmitting four bursts on a GPRS/EGPRS Packet Data Channel i.e. 20 ms, into two subperiods of length 10 ms each. Furthermore, in this exemplary embodiment, the first downlink Packet Data Channel CH1D corresponding to the first uplink Packet Data Channel CH1U and the second downlink Packet Data Channel CH2D corresponding to the second uplink Packet Data Channel CH2U are configured to represent timing of different subperiods within the basic uplink period. Thus an Uplink State Flag transmitted on the first downlink Packet Data Channel CH1D indicates that the Temporary Block Flow associated with said Uplink State Flag on the first downlink Packet Channel CH1D has been allocated timeslots on both uplink Packet Data Channels CH1U and CH2U for transmission of a radio block during a first half of the basic uplink period, while an Uplink State Flag transmitted on the second downlink Packet Data Channel CHD2 indicates that the Temporary Block Flow associated with said Uplink State Flag on the second downlink Packet Data Channel CHD2 has been allocated timeslots on both uplink Packet Data Channels CH1U and CH2U during a second half of the basic uplink period (as an alternative it would of course also have been possible to associate the first downlink Packet Data Channel CH1D with the second half of the basic uplink period and the second Packet Data Channel CH2D with the preceding first half of the basic uplink period). Thus a mobile station which has been allocated resources for transmission of a radio block on both uplink channels CH1U and CH2U, can derive the timing of the scheduled radio block (i.e. the scheduled sub-period within the basic uplink period) utilizing knowledge of on which downlink Packet Data Channel an Uplink State Flag associated (via an uplink Temporary Block Flow) with the mobile station was received.

Thus, at step 404 the radio communication network NET1 transmits an Uplink State Flag, associated with the Temporary Block Flow for which the first radio block was scheduled at step 402, on the first downlink Packet Data Channel CH1D and also an Uplink State Flag, associated with the Temporary Block Flow for which the second radio block was scheduled at step 403, on the second downlink Packet Data Channel CH2D.

If the radio block mapping mode of the uplink Temporary Block Flow examined at step 401 indicates that all bursts should be mapped on one channel (an alternative "1 CHANNEL" at step 401), the radio communication network NET1 determines at step 405 which uplink Packet Data Channel said Temporary Block Flow is associated with.

If said Temporary Block Flow is associated with the first uplink Packet Data Channel CH1U (an alternative "FIRST" at step 405), the radio communication network NET1 schedules, at step 406, time slots on the first uplink Packet Data Channel CH1U for transmission of a radio block for said Temporary Block Flow and also time slots on the second uplink Packet Data Channel CH2U for transmission of another radio block for a Temporary Block Flow next in turn for getting resources on the second uplink Packet Data Channel CH2U.

If said Temporary Block Flow is associated with the second uplink Packet Data Channel CH2U (an alternative "SECOND" at step 402), the radio communication network NET1 schedules, at step 407, time slots on the second uplink Packet Data Channel CH2U for transmission of a radio block for said Temporary Block Flow and also time slots on the first uplink Packet Data Channel CH1U for transmission of another radio block for a Temporary Block Flow next in turn for getting resources on the first uplink Packet Data Channel CH1U.

In situations where said Temporary Block Flow is found to be associated with both the first and the second uplink Packet Data Channels CH1U and CH2U, the radio communication network NET1 alternates between scheduling according to steps 406 and 407.

At step 408 the radio communication network NET1 transmits an Uplink State Flag associated with the Temporary Block Flow for which a radio block was scheduled on the first uplink Packet Data Channel CH1U on the first downlink packet Data Channel CH1D and an Uplink State Flag associated with the Temporary Block Flow for which a radio block was scheduled on the second uplink Packet Data Channel CH2U on the second downlink packet Data Channel CH2D.

Figure 5:
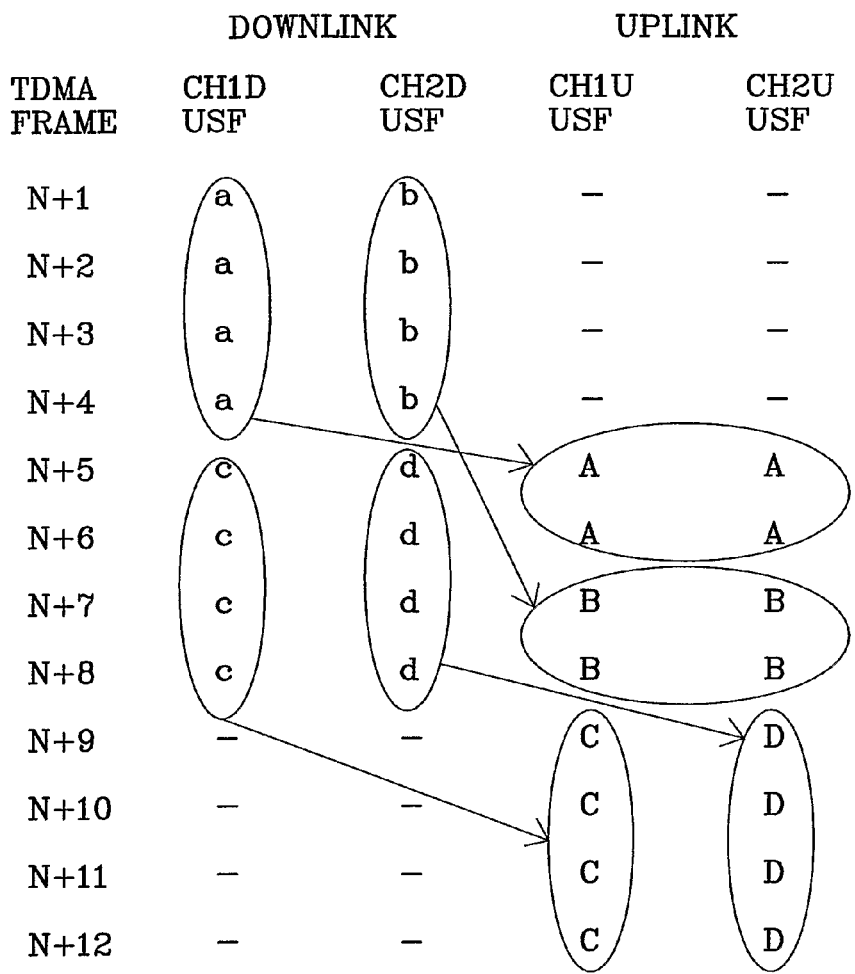
FIG. 5 is a channel diagram illustrating an example scenario of Uplink State Flag transmissions on two downlink PDCHs triggering transmission of scheduled radio blocks on the corresponding uplink PDCHs.

FIG. 5 illustrates en example scenario where scheduling according to FIG. 4 has been performed. According to this example scenario, a first mobile station MS1 and a second mobile station MS2 in FIG. 1 are EGPRS mobile stations supporting the proposed new way of mapping radio blocks while a third mobile station MS3 and a fourth mobile station MS4 in FIG. 3 are legacy mobile stations. In this example scenario, there is a first Temporary Block Flow through which the first mobile station MS1 has been associated with an Uplink State Flag a on the first downlink Packet Data Channel CH1D, a second Temporary Block Flow through which the second mobile station MS1 has been associated with an Uplink State Flag b on the second downlink Packet Data Channel CH2D, a third Temporary Block Flow through which the third mobile station MS3 has been associated with an Uplink State Flag c on the first downlink Packet Data Channel CH1D and a fourth Temporary Block Flow through which the fourth mobile station MS4 has been associated with an Uplink State Flag d on the second downlink Packet Data Channel CH2D.

In this example scenario, when performing the processing according to step 401 in order to schedule uplink transmissions in the basic uplink period corresponding to TDMA frames N+5 to N+8 on the first and second uplink Packet Data Channels CH1U and CH2U, the first Temporary Block Flow is next in turn for getting resources scheduled on both uplink Packet Data Channels CH1U and CH2U. Hence time slots are scheduled at step 402 on both uplink Packet Data Channels CH1U and CH2U for transmission of a first radio block A for the first Temporary Block Flow. At step 403 time slots are scheduled on both uplink packet Data Channels CH1U and CH2U for transmission of a second radio block B for the second Temporary Block Flow since the second Temporary Block Flow was next in line after the first Temporary Block Flow for having resources scheduled on both uplink Packet Data Channels CH1U and CH2U.

In accordance with how uplink resources have been scheduled in TDMA frames N+5 to N+8, the Uplink State Flag a associated with the first Temporary Block Flow is transmitted on the first downlink Packet Data Channel CH1D and the Uplink State Flag b associated with the second Temporary Block Flow is transmitted on the second downlink Packet Data Channel CH2D at step 404 in TDMA frames N+1 to N+4.

Upon returning to step 401 in order to schedule uplink transmissions in another basic uplink period corresponding to TDMA frames N+9 to N+12 on the first and second uplink Packet Data Channels CH1U and CH2U, the third Temporary Block Flow is next in turn for getting resources scheduled on either one of the uplink Packet Data Channels CH1U and CH2U. The third Temporary Block Flow has only been assigned the first Uplink Packet Data Channel CH1U, hence time slots are scheduled at step 406 on the first Uplink Packet Data Channel CH1U for transmission of a radio block C for the third Temporary Block Flow in TDMA frames N+9 to N+12. Time slots are also scheduled at step 406 on the second Uplink Packet Data Channel CH2U in TDMA frames N+9 to N+12 for transmission of another radio block D for the fourth Temporary Block Flow which is next in turn for getting resources on the second uplink Packet Data Channel CH2U.

In accordance with how uplink resources have been scheduled in TDMA frames N+9 to N+12, the Uplink State Flag c associated with the third Temporary Block Flow is transmitted on the first downlink Packet Data Channel CH1D and the Uplink State Flag d associated with the second Temporary Block Flow is transmitted on the second downlink Packet Data Channel CH2D at step 408 in TDMA frames N+5 to N+8.

Please note that even though not illustrated in the present example scenario, the first and second mobile stations MS1-MS2 would typically be associated with Uplink State Flags on both downlink Packet Data Channels CH1D-CH2D so as to provide full flexibility as regards in which subperiod (i.e. the first half or the second/last half) within a basic uplink period said mobile stations MS1-MS2 may be scheduled uplink transmission resources on both uplink Packet Data Channels CH1U-CH2U.

Figure 6:
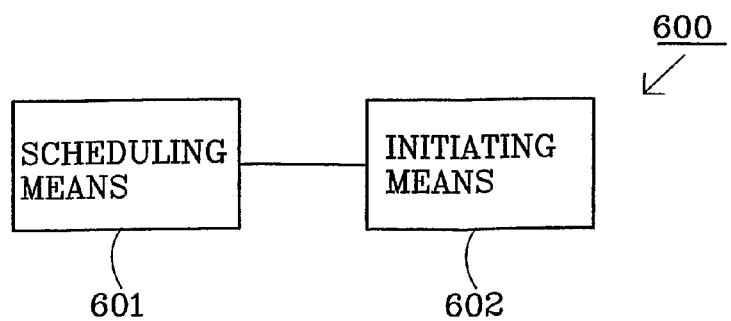
FIG. 6 is a block diagram illustrating a first exemplary embodiment of a control apparatus according to the invention.

In the context of the exemplary radio communication system SyS1 illustrated in FIG. 1, the Base Station Controller BSC1 of FIG. 1 performs most of the method steps of FIG. 4 (except the actual radio transmission parts of steps 404 and 408). Thus, the Base Station Controller BSC1 provides one exemplary embodiment of a control apparatus according to the invention for scheduling uplink transmission resources in connection with packet switched communication. The base station controller BSC1 includes digital data processing circuitry in the form of a programmable processor CP1 (see FIG. 1). The processor is in particular programmed to function as scheduling means scheduling time slots for transmission of bursts on the uplink Packet Data Channels CH1U and CH2U, and thus performs the method steps 401-403 and 405-407 of FIG. 4. The processor is also programmed to function as initiating means for initiating transmission (see steps 404 and 408 of FIG. 4) of appropriate Uplink State Flags on the appropriate downlink Packet Data Channels CH1D and CH2D informing the mobile stations MS1-MS4 how uplink transmission resources have been scheduled. The actual radio transmission of said Uplink State Flags on the downlink Packet Data Channels CH1D and CH2D are however performed by the base transceiver station BTS1 in response to instructions provided to the base transceiver station BTS1 from the base station controller BSC1. FIG. 6 schematically illustrates a logical block diagram of a control apparatus 600 according to the invention comprising said scheduling means 601 operable connected to said initiating means 602.

Figure 7:
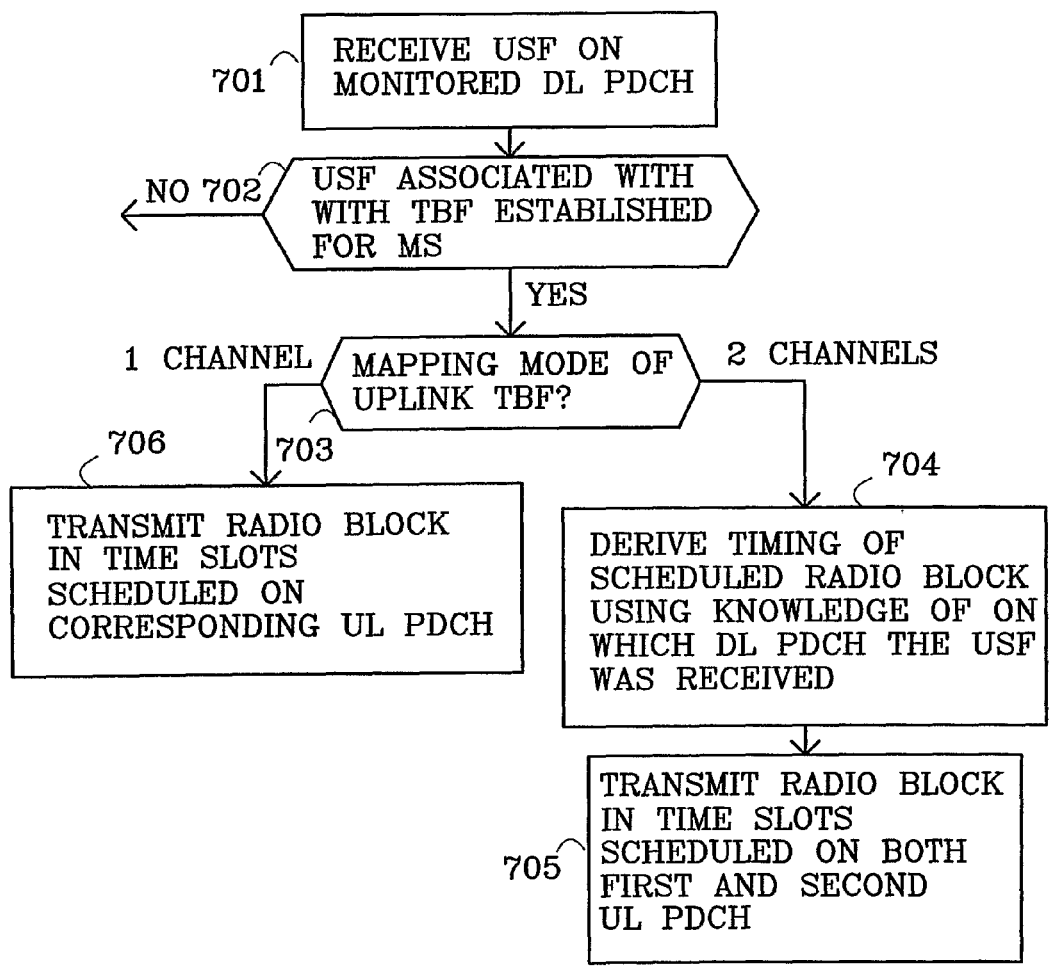
FIG. 7 is a flow diagram illustrating a first exemplary embodiment of a method for uplink transmission according to the invention.

FIG. 7 is a flow diagram illustrating a method in a mobile station for performing uplink transmission according to a first exemplary embodiment of the invention. This exemplary method may e.g. be implemented in the first mobile station MS1 of FIG. 1 and used for performing uplink transmissions in the radio communication system SYS1 in FIG. 1. In this exemplary embodiment, the mobile station MS1 supports both radio block mapping according to the legacy radio block mapping of GPRS/EGPRS (i.e. mapping an uplink radio block as four bursts on one uplink Packet Data Channel) and the proposed new radio block mapping in which bursts of an uplink radio block are mapped onto at least two different uplink Packet Data Channels such as the first Uplink Packet Data Channel CH1U and the second Uplink Packet Data Channel CH2U. The radio communication network NET1 and the mobile station MS1 need to agree on how radio blocks are mapped in the uplink direction and how Uplink State Flags received by the mobile station MS1 should be interpreted. In this exemplary embodiment, the radio block mapping mode is agreed between the radio communication network and the mobile station upon configuration of uplink Temporary Block Flows for the mobile station MS1, and thus similar to the radio communication network NET1, the mobile station MS1 maintains a radio block mapping attribute for each of its uplink Temporary Block Flows indicating whether the radio blocks of the uplink Temporary Block Flow should all be mapped as four bursts on a single uplink Packet Data Channel or as two bursts each on two different uplink Packet Data Channels.

At step 701, the mobile station receives an Uplink State Flag on one of the downlink Packet Data Channels it is monitoring. The selection of downlink Packet Data Channels the mobile station is currently monitoring is determined by on which downlink Packet Data Channels uplink Temporary Block Flows of the mobile station MS1 have been assigned Uplink State Flags.

At step 702 the mobile station MS1 determines whether the received Uplink State Flag is associated with one of its uplink Temporary Block Flows, i.e. whether the received Uplink State Flag is associated with the mobile station MS1. If the received Uplink State Flag is not associated with one of the mobile stations uplink Temporary Block Flows (an alternative NO at step 702), processing as a result of receiving this Uplink State Flag is finished.

If the received Uplink State Flag is indeed associated with one of the mobile stations uplink Temporary Block Flows (an alternative YES at step 702), the mobile station MS1 checks the radio block mapping mode of the concerned uplink Temporary Block Flow at step 703.

If the radio block mapping mode of said uplink temporary Block Flow indicates that bursts should be mapped onto both the first uplink Packet Data Channel CH1U and the second uplink Packet Data Channel CH2U (an alternative "2 CHANNELS" at step 703), processing continues at step 704 where the mobile station MS1 derives timing of the radio block which has been scheduled for said uplink Temporary Block Flow on said uplink Packet Data Channels CH1U and CH2U. The mobile station MS1 derives said timing of the scheduled radio block using knowledge of on which downlink Packet Data Channel CH1D or CH2D said Uplink State Flag was received. The mobile station MS1 and the radio communication network NET1 has a common understanding (either implicit from fixed protocol rules or from explicit signaling information exchanged when configuring the concerned uplink Temporary Block Flow) of how different downlink Packet Data Channels represents different subperiods within a basic uplink period. Thus, as already elaborated in connection with FIG. 4, in this exemplary embodiment the first downlink Packet Data Channel CH1D corresponds to the first 10 ms subperiod of the upcoming 20 ms basic uplink period while the second downlink Packet Data Channel CH2D corresponds to the second 10 ms subperiod of said basic uplink period. Consequently, if the Uplink State Flag was received on the first downlink Packet Data Channel CH1D, the mobile stations concludes that the radio block is scheduled in the first 10 ms subperiod of said basic uplink period, while if the Uplink State Flag was received on the second downlink Packet Data Channels CH2D, said radio block is scheduled in the second 10 ms subperiod of said basic uplink period.

At step 705, the mobile station transmits said scheduled radio block for said uplink Temporary Block Flow in the time slots scheduled on both the first and the second uplink Packet Data Channels CH1U and CH2U. Depending on the results at step 704, the radio block is thus either transmitted in the first two time slots on both uplink Packet Data Channels CH1U and CH2U or in the last two time slots on both uplink Packet Data Channels CH1U and CH2U in the upcoming basic uplink period.

If the radio block mapping mode of said uplink Temporary Block Flow indicates that all bursts should be mapped on one uplink Packet Data Channel (an alternative "1 CHANNEL" at step 703), processing continues at step 706 where the mobile station MS1 transmits said scheduled radio block for said uplink Temporary Block Flow in the time slots scheduled on the uplink Packet Data Channel corresponding to the downlink Packet Data Channel on which the Uplink State Flag was received at step 701. Thus, if the Uplink State Flag was received on the first downlink Packet Data Channel CH1D, the mobile station transmits the radio block on the first uplink Packet Data Channel CH1U, while if the Uplink State Flag was received on the second downlink Packet Data Channel CH2D, the mobile station transmits the radio block on the second uplink Packet Data Channel CH2U.

Returning to the example scenario illustrated in FIG. 5, performing processing according to FIG. 7 in the first mobile station MS1 would result in the first mobile station MS1 receiving Uplink State Flag a in TDMA frames N+1 to N+4 on the first downlink Packet Data Channel CH1D at step 701. The mobile station MS1 would then conclude that it has been scheduled an uplink radio block on both uplink Packet Data Channels CH1U and CH2U. At step 704 the mobile station MS1 would derive timing of said scheduled radio block as being the first half of the upcoming basic period in TDMA frames N+5 to N+8 from the fact that the Uplink State Flag was received on the first downlink Packet Data Channel CH1D. The mobile station would finally transmit radio block A in the timeslots scheduled on the first and second uplink Packet Data Channels CH1U-CH2U during TDMA frames N+5 and N+6.

Figure 8:
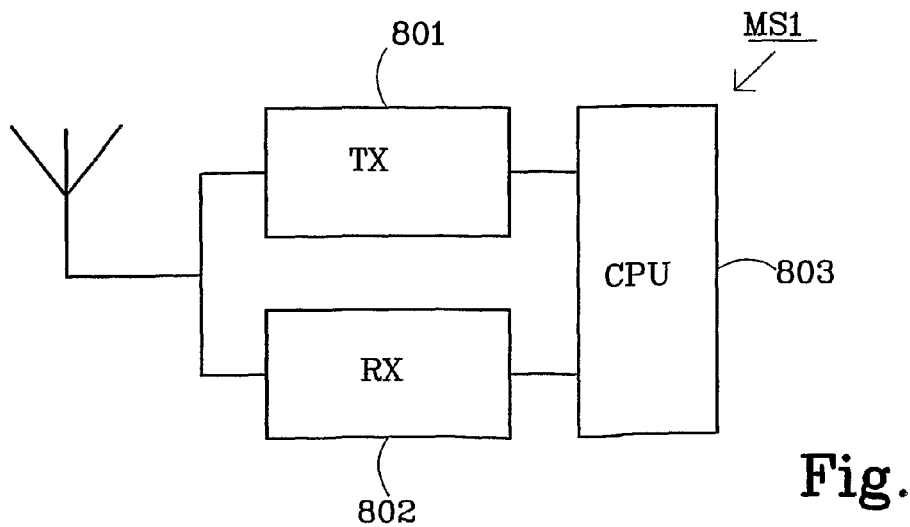
FIG. 8 is a block diagram illustrating a first exemplary embodiment of a mobile station according to the invention.

FIG. 8 schematically illustrates an exemplary first embodiment of a mobile station (e.g. mobile station MS1 in FIG. 1) according to the invention for implementing the method illustrated in FIG. 7. The mobile station MS1 includes a transmitter 801 and a receiver 802, both operable connected to digital data processing circuitry in the form of a programmable processor 803. The transmitter 801 is adapted to transmit and the receiver 802 is adapted to receive radio signals according to the 3GPP specifications for the Um radio interface. The processor 803 controls and coordinates the operations of the transmitter 801 and the receiver 802. The processor is in particular programmed to, in response to being informed by the receiver 802 of reception of an Uplink State Flag (step 701 in FIG. 7), perform processing according to steps 702-704 in order to identify uplink transmission resources scheduled for the mobile station and order the transmitter 801 to perform uplink transmission utilizing said identified resources (step 705 in FIG. 7).

Apart from the exemplary embodiment of the invention disclosed above, there are several ways of providing rearrangements, modifications and substitutions of the disclosed embodiment resulting in additional embodiments of the invention.

The uplink Packet Data Channels CH1U and CH2U and corresponding downlink Packet Data Channels CH1D and CH2D may in some embodiments of the invention be provided as different time slots on the same radio frequency channel (or the same sequence of different radio frequency channels) according to the current multislot scheme of GPRS/EGPRS. In other embodiments of the invention, the uplink Packet Data Channels CH1U and CH2U and corresponding downlink Packet Data Channels CH1D and CH2D may instead be provided using a common time slot but two different radio frequency channels (or two different sequences of different radio frequency channels) according to a multi carrier scheme.

The concept of extended dynamic allocation may be applied in the context of the invention. Thus, the radio communication network may indicate to a mobile station associated with an uplink Temporary Block Flow, that it has been scheduled resources in a selected subperiod and all following subperiods (alternatively all preceding subperiods) within a basic uplink period, by transmitting an Uplink State Flag associated with the uplink Temporary Block Flow on a downlink Packet Data Channel representing the selected subperiod.

The concept of Uplink State Flag granularity may also be applied in the context of the invention. Thus, the radio communication network may indicate to a mobile station associated with an uplink Temporary Block Flow, that it has been scheduled resources in a selected subperiod in one or four consecutive basic uplink periods, by transmitting an Uplink State Flag associated with the uplink Temporary Block Flow on a downlink Packet Data Channel representing the selected subperiod.

Existing signaling mechanisms for configuring Temporary Block Flows as regards use of extended dynamic allocation and/or Uplink State Flag granularity may be used for configuring Temporary Block Flows in connection with the invention. Support for an arbitrary Uplink State Flag granularity (i.e. not only one or four), could be provided by extending the signaling mechanisms accordingly.

There are different alternatives for how radio block mapping in the downlink direction may be performed for the downlink Packet Data Channels corresponding to the set of at least two uplink Packet Data Channels for which scheduling of transmission resources and uplink transmission are performed according to the present invention.

One alternative would be to maintain the legacy radio block mapping, i.e. transmitting all bursts of a radio block on one downlink Packet Data Channel. In embodiments of apparatuses and methods of the invention utilizing this alternative, there is no impact on how Uplink State Flags are transmitted. Both legacy GPRS/EGPRS mobile stations only supporting the legacy radio block mapping as well as new EGPRS mobile stations supporting the new radio block mapping in the uplink can both monitor Uplink States Flags and receive data (i.e. have downlink Temporary Block Flows for receiving application data, RLC/MAC control signaling or higher layer signaling) on downlink Packet Data Channels which only use the legacy radio block mapping mode.

Another alternative would be to introduce the new radio block mapping, i.e. mapping a radio block on at least two different Packet Data Channels, also in the downlink direction. In embodiments of apparatuses and methods of the invention utilizing this alternative, the Uplink State Flags would still need to be transmitted in four bursts on one downlink Packet Data Channel in order not to confuse any legacy mobile multiplexed on any one of the channels in said set of at least two uplink Packet Data Channels and hence monitoring Uplink State Flag transmissions on the corresponding downlink Packet Data Channels. Both legacy GPRS/EGPRS mobile stations only supporting the legacy radio block mapping as well as new EGPRS mobile stations supporting the new radio block mapping in the uplink can monitor Uplink States Flags but only new EGPRS mobile stations supporting the new radio block mapping in the downlink will be able to receive data (i.e. have downlink Temporary Block Flows) on downlink Packet Data Channels when the new radio block mapping mode is used. Since only new mobile stations anyway can receive data on downlink Packet Data Channels when the new radio block mapping mode is used, additional/new requirements on coding schemes, burst formats etc may be placed on mobile stations which need to receive data encoded according to the new radio block mapping scheme.

If only the new radio block mapping is used on a set of downlink Packet Data Channels, it will not be possible to transmit data to legacy mobile stations, i.e. provide downlink Temporary Block Flows for legacy mobile station, on this set of downlink Packet Data Channels. As an alternative, it is possible to provide downlink Temporary Block flows for legacy mobile stations by applying a mixed mode of operation wherein the legacy radio block mapping (i.e. mapping a radio block on a single downlink. Packet Data Channel) is applied for a set of downlink Packet Data Channels when transmitting data to legacy mobile stations and the new radio block mapping (i.e. mapping a radio block on at least two different downlink Packet Data Channels) is applied when transmitting data to mobile stations supporting this new radio block mapping scheme.

Mapping radio blocks on at least two different Packet Data Channels while still transmitting each Uplink State Flags in four bursts on one downlink Packet Data Channel, causes the Uplink State Flag to be transmitted in bursts belonging to two different radio blocks. FIG. 9 schematically illustrates an example scenario where two radio blocks in the downlink direction are both mapped onto both downlink Packet Channels CH1D and CH2D of the system illustrated in FIG. 1. Thus the first downlink radio block is transmitted in four bursts b11-b14, while the second downlink radio block is transmitted in four bursts b21-b24. A first Uplink State Flag transmitted on downlink Packet Data Channel CH1D in TDMA frames M+1 to M+4 is encoded in bursts b11 and b13 of the first radio block and bursts b21 and b23 of the second radio block. In a similar way, a second Uplink State Flag transmitted on downlink Packet Data Channel CH2D in TDMA frames M+1 to M+4 is encoded in bursts b12, b14 of the first radio block and bursts b22 and b24 of the second radio block. Thus the sequence of bursts conveying the first Uplink State Flag consists of bursts b11, b13, b21 and b23 and the sequence of bursts conveying the second Uplink State Flag consists of bursts b12, b14, b22 and b24. Other alternatives of course also exists for the order in which burst of a radio block could be mapped as two bursts each on both downlink packet data channels CH1D and CH2D.

The necessary measures needed to ensure proper burst contents for transmission of data and Uplink State Flags in the downlink direction depends on the coding scheme used in consecutive radio blocks used for transmission of an Uplink State Flag. Please note that the discussion below mainly relate to existing coding schemes, but it is of course also possible to define new coding schemes for use in connection with the invention.

For coding schemes MCS-1 to MCS-9 defined for EGPRS Radio Blocks the following situations arise:

For coding schemes MCS-5 to MCS-9, the bit positions representing Uplink State Flags (USF bits) in each burst are always the same bits (Bit positions 150, 151, 168, 169, 171, 172, 177, 178, 195 in each burst). In the context of the example scenario of FIG. 9, the USF bits in the sequence of bursts used to convey the first Uplink State Flag would be encoded the same way as if the first Uplink State Flag was transmitted in one radio block mapped as four consecutive bursts on the first downlink Packet Data Channel CH1D. Stealing Flag (SF) bits do not need to be examined for decoding the Uplink State Flags for these coding schemes and can thus be mapped entirely within a single radio block transmitted on both downlink Packet Data Channels CH1D-CH2D and used to enable a mobile station decoding said radio block to determine whether the radio block header follows the MCS-5 to MCS-6 format or the MCS-7 to MCS-9 format and perform decoding accordingly.

For coding schemes MCS-1 to MCS-4, the position of the USF bits vary in each burst as follows:
burst 1: bit positions 0, 50, 100;
burst 2: bit positions 34, 84, 98;
burst 3: bit positions 18, 68, 82;
burst 4: bit positions 2, 52, 66.

For these coding scheme, the USF bit positions of the transmitted bursts need to be adjusted so that each burst in a sequence of four bursts (belonging to two different radio blocks) transmitted on one downlink Packet Data Channel follows the above scheme. In the context of the example scenario of FIG. 9, the USF bits in the sequence of bursts on the first downlink Packet Data Channel CH1D used to convey the first Uplink State Flag, i.e. b11, b13, b21 and b23, need to follow the above scheme. This of course also applies to the sequence of bursts on the second downlink Packet Data Channel CH1D used to convey the second Uplink State Flag, i.e. b12, b14, b22, b24. Further, the Stealing Flag bits (positions 57 and 58) of each burst in said sequence of bursts on the respective downlink Packet Data Channel need to be set to indicate CS-4 (i.e. the sequence [00, 01, 01, 10]). EGPRS mobile stations capable of and needing to decode a radio block mapped on both downlink Packet Data Channels CH1D and CH2D, can determine from detecting GMSK modulation of the transmitted bursts that the radio blocks must have a header format according to the MCS-1 to MCS-4 format and perform decoding accordingly.

A modified coding of CS-1 radio blocks could be used (for providing e.g. RLC/MAC signaling) in which the same header format as for MCS-1 to MCS-4 is used and indicating in the header that this modified CS-1 coding scheme has been used. The same measures as discussed above for MCS-1 to MCS-4 apply.

Since coding schemes MCS-1 to MCS-4 (and the proposed modified CS-1 coding scheme) use GMSK modulation while coding schemes MCS-5 to MCS-9 use 8-PSK modulation, and a legacy mobile station would not be able to read an Uplink State Flag if the associated bursts used different modulations, the scheduling of downlink radio blocks/selection of coding schemes should be made so as to ensure that this situation does not arise.

In the first exemplary embodiments of a mobile station according to the invention, digital data processing circuitry in the form of a conventional programmable processor is used for identifying uplink transmission resources scheduled for the mobile station. In a similar way, in the first exemplary embodiment of a control apparatus according to the invention, digital data processing circuitry in the form of a conventional programmable processor acts both as scheduling means and initiating means. However, any digital data processing circuitry capable of performing these processing tasks could be used, e.g. multiple processors working in series or in parallel, ASICs, discrete logic circuits etc. Programmable devices performing processing according to the invention, can be dedicated to this task or used also for processing related to other tasks.

Instead of having the base station controller BSC1 acting as a control apparatus according to the invention for scheduling uplink transmission resources, other nodes in the radio communication network NET1, such as the base transceiver station BTS1 and the serving GPRS node SGSN1, could act as such control apparatuses.

Initially it would be desirable that both radio communication networks and mobile stations support both the legacy radio block mapping mode and the proposed new radio block mapping mode. However, as radio communication networks get upgraded and in particular legacy mobile stations are replaced by new mobile stations, the support of legacy radio block mapping mode for uplink transmissions may eventually be abandoned. Thus embodiments of the invention may be provided which both support a mix of the legacy radio block mapping and the proposed new radio block mapping as well as embodiments only supporting the new radio block mapping.

When scheduling all time slots in a basic uplink period on at least two Uplink packet Data Channels to one mobile station, the mobile station may be allowed to decide how it prefers to perform radio block mapping, e.g. as two radio blocks each mapped on only one uplink Packet Data Channel or as two radio blocks each mapped on both uplink packet Data Channels in different subperiods of said basic uplink period. The radio communication network can then decide the type of radio block mapping used by the mobile station e.g. by attempting to decode radio blocks according to the different possible alternatives and decide which alternative is most likely.

The invention claimed is:

1. A method in a radio communication network for scheduling uplink transmission resources in connection with packet switched communication, wherein uplink and downlink transmissions are segmented into radio blocks and each radio block is transmitted in a plurality of bursts, said method comprising the steps of:
   scheduling time slots for transmission of bursts of a first radio block on at least two different uplink packet data channels in a first subperiod within a basic uplink period; and,
   transmitting an Uplink State flag associated with a mobile station for which said first radio block was scheduled on a first downlink packet data channel selected from a group of downlink packet data channels corresponding to each of said at least two different uplink packet data channels, wherein each different downlink packet data channel in said group represents a different subperiod within said basic uplink period and said first downlink packet data channel represents said first subperiod within said basic uplink period.

2. The method according to claim 1, further comprising the steps of:
   scheduling time slots for transmission of bursts of a second radio block on said at least two different uplink packet data channels in a second subperiod within said basic uplink period; and,
   transmitting an Uplink State flag associated with a mobile station for which said second radio block was scheduled on a second downlink packet data channel selected from said group of downlink packet data channels, wherein said second downlink packet data channel represents said second subperiod within said basic uplink period.

3. The method according to claim 2, wherein said first subperiod precedes said second subperiod in said basic uplink period.

4. The method according to claim 2, wherein said second subperiod precedes said first subperiod in said basic uplink period.

5. The method according to claim 1, wherein the length of said basic uplink period corresponds to the time required for transmitting all bursts of a radio block on one uplink Packet Data Channel.

6. The method according to claim 1, wherein said at least two different uplink packet data channels consist of two uplink packet data channels and said basic uplink period has two subperiods.

7. The method according to claim 1, wherein said at least two different uplink packet data channels consist of four uplink packet data channels and said basic uplink period has four subperiods.

8. The method according to claim 1, further comprising the steps of:
   scheduling time slots for transmission of all bursts of a third radio block on one of said at least two different uplink packet data channels in another basic uplink period; and,
   transmitting an Uplink State flag associated with a mobile station for which said third radio block was scheduled on a downlink packet data channel corresponding to said uplink packet data channel on which said time slots for transmitting bursts of said third radio block were scheduled.

9. A method in a mobile station for uplink transmission in connection with packet switched communication, wherein uplink and downlink transmissions are segmented into radio blocks and each radio block is transmitted in a plurality of bursts, said method comprising the steps of:
   receiving an Uplink State Flag associated with the mobile station on a first downlink packet data channel;
   identifying scheduled resources for transmission of a first radio block in accordance with a radio block mapping mode in which the bursts of the first radio block are scheduled for transmission in time slots on at least two different uplink packet data channels in a first subperiod within a basic uplink period, wherein said first downlink packet data channel is one of a group of downlink packet data channels corresponding to each of said at least two different uplink packet data channels, wherein each different downlink packet data channel in said group represents a different subperiod within said basic uplink period and wherein the timing of said first subperiod within said basic uplink period is derived utilizing the fact that said Uplink State Flag was received on said first downlink packet data channel; and,
   transmitting the first uplink radio block utilizing the resources identified in said identifying step.

10. The method according to claim 9, wherein the length of said basic uplink period corresponds to the time required for transmitting all bursts of a radio block on one uplink Packet Data Channel.

11. The method according to claim 9, wherein said at least two different uplink packet data channels consist of two uplink packet data channels and said basic uplink period has two subperiods.

12. The method according to claim 9, wherein said at least two different uplink packet data channels consist of four uplink packet data channels and said basic uplink period has four subperiods.

13. A control apparatus in a radio communication network for scheduling uplink transmission resources in connection with packet switched communication, wherein uplink and downlink transmissions are segmented into radio blocks and each radio block is transmitted in a plurality of bursts, said apparatus comprising:
   scheduling means for scheduling time slots for transmission of bursts of a first radio block on at least two different uplink packet data channels in a first subperiod within a basic uplink period; and,
   initiating means for initiating transmission of an Uplink State Flag associated with a mobile station for which said first radio block was scheduled on a first downlink packet data channel selected from a group of downlink packet data channels corresponding to each of said at least two different uplink packet data channels, wherein each different downlink packet data channel in said group represents a different subperiod within said basic uplink period and said first downlink packet data channel represents said first subperiod within said basic uplink period.

14. The control apparatus according to claim 13, wherein said scheduling means are further arranged for scheduling time slots for transmission of bursts of a second radio block on said at least two different uplink packet data channels in a second subperiod within said basic uplink period; and, wherein said initiating means are further arranged for initiating transmission of an Uplink State flag associated with a mobile station for which said second radio block was scheduled on a second downlink packet data channel selected among said group of downlink packet data channels, wherein said second downlink packet data channel represents said second subperiod within said basic uplink period.

15. The control apparatus according to claim 14, wherein said first subperiod precedes said second subperiod in said basic uplink period.

16. The control apparatus according to claim 14, wherein said second subperiod precedes said first subperiod in said basic uplink period.

17. The control apparatus according to claim 13, wherein the length of said basic uplink period corresponds to the time required for transmitting all bursts of a radio block on one uplink Packet Data Channel.

18. The control apparatus according to claim 13, wherein said at least two different uplink packet data channels consist of two uplink packet data channels and said basic uplink period has two subperiods.

19. The control apparatus according to claim 13, wherein said at least two different uplink packet data channels consist of four uplink packet data channels and said basic uplink period has four subperiods.

20. The control apparatus according to claim 13,
wherein said scheduling means are further arranged for scheduling time slots for transmission of all bursts of a third radio block on one of said at least two different uplink packet data channels in another basic uplink period; and,
wherein said initiating means are further arranged for initiating transmission of an Uplink State flag associated with a mobile station for which said third radio block was scheduled on a downlink packet data channel corresponding to said uplink packet data channel on which said time slots for transmitting bursts of said third radio block were scheduled.

21. A mobile station capable of performing uplink transmission in connection with packet switched communication wherein uplink and downlink transmissions are segmented into radio blocks and each radio block is transmitted in a plurality of bursts, said mobile station comprising:
a receiver for receiving an Uplink State Flag associated with the mobile station on a first downlink packet data channel;
data processing circuitry for identifying scheduled resources for transmission of a first radio block in accordance with a radio block mapping mode in which bursts of the first radio block are scheduled for transmission in time slots on at least two different uplink packet data channels in a first subperiod within a basic uplink period, wherein said first downlink packet data channel is one of a group of downlink packet data channels corresponding to each of said at least two different uplink packet data channels, wherein each different downlink packet data channel in said group represents a different subperiod within said basic uplink period and wherein the timing of said first subperiod within said basic uplink period is derived utilizing the fact that said Uplink State Flag was received on said first downlink packet data channel; and,
a transmitter for transmitting the first radio block utilizing the resources identified as scheduled for transmission of said first radio block.

22. The mobile station according to claim 21, wherein the length of said basic uplink period corresponds to the time required for transmitting all bursts of a radio block on one uplink Packet Data Channel.

23. The mobile station according to claim 21, wherein said at least two different uplink packet data channels consist of two uplink packet data channels and said basic uplink period has two subperiods.

24. The mobile station according to claim 21, wherein said at least two different uplink packet data channels consist of four uplink packet data channels and said basic uplink period has four subperiods.

\* \* \* \* \*

UNITED STATES PATENT AND TRADEMARK OFFICE
CERTIFICATE OF CORRECTION

PATENT NO. : 8,638,727 B2  
APPLICATION NO. : 12/091378  
DATED : January 28, 2014  
INVENTOR(S) : Björkén Page 1 of 1

It is certified that error appears in the above-identified patent and that said Letters Patent is hereby corrected as shown below:

On the Title Page, in item (12), under "United States Patent", in Column 1, Line 1, delete "Bjórken" and insert -- Björkén --, therefor.

On the Title Page, in item (75), under "Inventor", in Column 1, Line 1, delete "Peter Bjórken," and insert -- Peter Björkén, --, therefor.

In the Specification

In Column 9, Line 5, delete "SyS1" and insert -- SYS1 --, therefor.

Signed and Sealed this  
Twenty-second Day of July, 2014

Michelle K. Lee  
*Deputy Director of the United States Patent and Trademark Office*